Jan. 14, 1969  R. W. HERR  3,421,363
HARNESS FOR VERTICALLY SUPPORTING SLENDER
BODIES FOR VIBRATION TESTING
Filed July 1, 1965

INVENTOR
ROBERT W. HERR

BY

ATTORNEYS

United States Patent Office 3,421,363
Patented Jan. 14, 1969

1

3,421,363
HARNESS FOR VERTICALLY SUPPORTING SLENDER BODIES FOR VIBRATION TESTING
Robert W. Herr, Hampton, Va., assignor to the United States of America as represented by the Administrator of the National Aeronautics and Space Administration
Filed July 1, 1965, Ser. No. 469,011
U.S. Cl. 73—67.2          7 Claims
Int. Cl. G01n 29/00

ABSTRACT OF THE DISCLOSURE

A restraint harness for a vertically oriented, long, slender body. A support structure has support cables tied to it and to the body being supported. The support cables are located entirely below the center of gravity of the body. Restraint cables are connected to the body at points above the center of gravity of the body, entrained over pulleys anchored to the support structure, and fixed to the support cables completing the harness.

---

Figure 1:
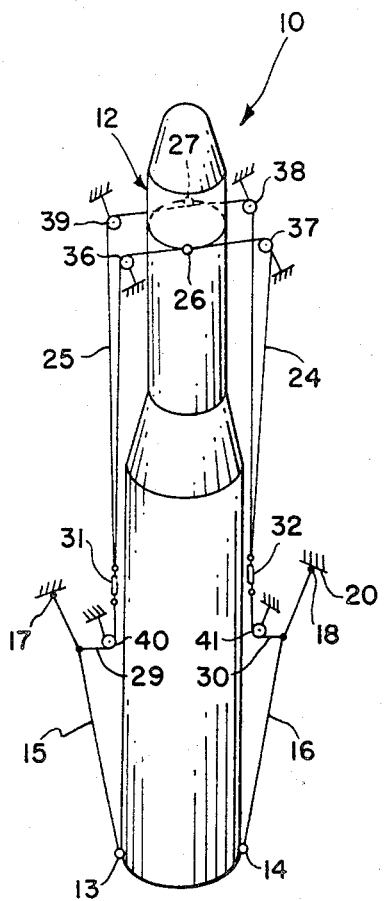

The invention described herein may be manufactured and used by or for the Government of the United States of America for governmental purposes without the payment of any royalties thereon or therefor.

This invention relates to a restraint system for slender bodies standing on their end, and more particularly to a restraint system which has a minimal effect on the free-free lateral vibration mode shapes and frequencies of the slender body.

The restraint system here under consideration has particular use in the testing of slender bodies, such as a spacecraft launch vehicle, for their response to vibratory inputs. The simulation of the free-free flight condition during ground vibration tests is made difficult by the fact that a massless elastic restraint added to the vehicle at any location other than a nodal point generally will yield measured frequencies higher than the actual free-free frequencies. The frequency increase caused as a result of the restraint system is dependent upon both the location and the magnitude of the restraint. Thus, one solution to the problem would appear to be to apply the restraints only at the nodal points of the vehicle. Practically, however, this is generally not possible, particularly with a space vehicle of the liquid fuel type which must be oriented vertically. This is true since the only part of the structure capable of supporting the entire weight of the vehicle is at the base where the engine thrust is transmitted to the structure.

Since it is necessary to stand the vehicle on its base, it has been determined that a rotational spring constant equal to the product of the weight and the distance from the base to the center of gravity must be provided to keep the vehicle from toppling. This has resulted in a technique of attaching a spring at the base of the vehicle to provide pitch restraint and thus keep the vehicle from toppling. This arrangement has the advantage of requiring no massive extraneous structure to support the vehicle; however, this type of restraint yields measured frequencies appreciably higher than the desired free-free values, especially for large vehicles. Furthermore, if the minimum pitch spring restraint is linear with the pitch angle, any lateral force, such as a horizontal wind gust, can impart velocity to the vehicle which will cause it to topple unless caught by safety stops. It has also been found that with this arrangement the stiffness of the restraining springs must be changed if the weight of the vehicle is changed, for example, a fueled vehicle as opposed to an unfueled vehicle. Thus, it can be seen that this type

2 of restraint system is difficult to work with although operational to a degree.

Another restraint system which has been utilized provides an arrangement whereby the weight of the vehicle is carried by two support cables attached to the bottom of the vehicle and to fixed overhead support structure. Stability is provided by two horizontal restraint cables tied between the support cables and the periphery of the vehicle at a point above the vehicle's center of gravity. For minimum pitch restraint, the support cables are separated at their attachment points to the overhead support structure until the vehicle will just stand erect. The separation distance of the cables is critical and, therefore, mechanism usually must be provided on the support structure for adjustment of the support cables (such as horizontal track and dollies). Another difficulty with this arrangement is that the restraining cables, and hence the support cable tiedown points, must be well above the center of gravity of the vehicle, necessitating a tall and massive support structure capable of supporting the entire weight of the vehicle. This is particularly true when testing full-scale launch vehicles.

The invention here under consideration utilizes the principle of the last mentioned support system; however, provides a novel arrangement thereover by utilizing a pulley system in conjunction with the various cables. With this arrangement, it is possible to support the weight of the launch vehicle by cables that are fixed to the support structure at a point well below that of the previous arrangement. Furthermore, the restraining cables can be fixed to the vehicle at a point above the center of gravity thereof, thus accomplishing the desired result and overcoming the above mentioned difficulties.

It is therefore an object of the invention to provide a restraint system for slender bodies standing on their end with no danger of toppling, yet having a minimal effect on the free-free lateral vibration mode shapes and frequencies thereof.

Yet another object of the invention is to provide a restraining system for elongated structures standing on their end which act as a nonlinear spring in the pitch direction resulting in an extremely soft spring when in a vertical attitude but rapidly increasing in stiffness with increasing angle of tilt.

Still another object of the invention is to provide a restraining system for slender bodies standing on their end wherein the support cable tiedown points are well below the center of gravity of the body.

A further object of the invention is to provide a restraining system for slender bodies standing on their end wherein tension in the support cables fixed to the base thereof is used to apply just the right amount of tension to restraining cables fixed to the vehicle to keep the vehicle from toppling.

These and other objects and advantages of the invention will become more apparent upon reading the specification in conjunction with the accompanying drawings.

Figure 2:
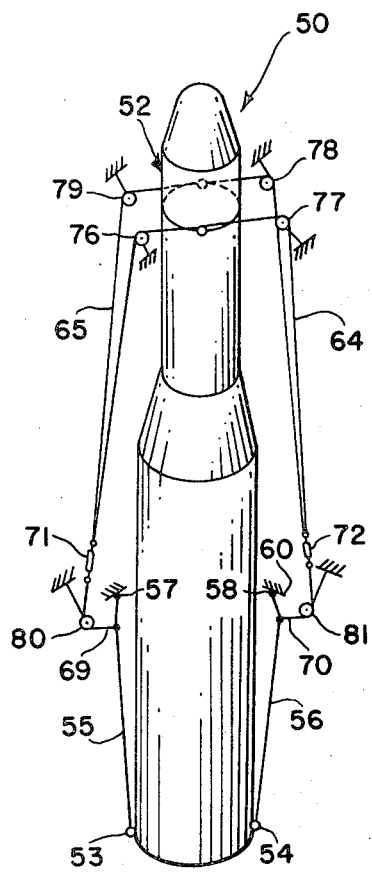

In the drawings:

FIG. 1 is a perspective view of the restraint system showing the restraining cables located inside the support cables; and FIG. 2 is a modified form of the invention showing the restraint cables located outside of the support cables.

Basically, this invention relates to a restraint system for tethering slender bodies resting on one of their ends. This is accomplished by fixing support cables to the base of the vehicle and anchoring the cables to surrounding support structure. The support cables are normally anchored at or below the horizontal plane passing through the center of gravity of the slender body. Restraining cables are connected to the support cables at some point intermediate their extremities and tied to the slender body at some point well above its center of gravity. The restraining cables are entrained over a series of pulleys or sheaves so that the cables are permitted a limited amount of movement as is the slender body fixed thereto when subjected to vibrations normal to the plane of the support cables. Tensioning means is placed in the restraining cables to provide the proper pitch restraint. Thus, the test body is supported without introducing unnecessary force components by tensioning the restraining cables to the point that they just hold the test structure erect.

Referring now more specifically to the details of the invention, FIG. 1 shows a restraint system designated generally by the reference numeral 10.

The system 10 is shown associated with a test body in the form of a launch vehicle 12; however, the technique may be utilized with any slender body which is resting on its end. Eyes 13 and 14 are fixed to the base of the vehicle 12 in a conventional manner such as by threaded fasteners or welding. These eyes are located at opposite points on the test structure. Support cables 15 and 16 are fastened respectively to the eyes 13 and 14. These cables are directed upwardly and anchored at points 17 and 18 on support tower 20. The support tower 20 is shown diagrammatically as a fixed structure. Obviously, any type of support tower may be utilized provided it has the necessary properties to support the test body.

Restraining cables 24 and 25 are fixed respectively to the test body at points 26 and 27 on opposite sides and at a position well above the center of gravity of the test body. The longitudinal location of points 26 and 27 may vary depending on the shape, size, etc., of the test body. This connection is made at a point approximately intermediate the ends of the restraining cables. The extremities of the restraining cables 24 and 25 are both connected to turnbuckles 31 at one end and to 32 at the other end. The turnbuckles in turn are connected to coupling cables 29 and 30 which are in turn fixed respectively to the support cables 15 and 16 at a point intermediate their ends.

Located in the horizontal plane containing restraining cable connection points 26 and 27 are sheaves 36, 37, 38, and 39. These sheaves are rigidly secured to the support tower 20 in a conventional manner. The restraining cable 24 is entrained over the sheaves 36 and 37, and the restrainig cable 25 over the sheaves 38 and 39. Pulleys 40 and 41 are rigidly connected to the support tower 20 at some point below the place at which the support cables 15 and 16 are anchored at 17 and 18 to the support tower. The restraining cable couplers 29 and 30 are entrained respectively over the pulleys 40 and 41.

In the modified form of the restraining system 50, the test body or launch vehicle 52 is again a slender body supported in a vertical attitude. The launch vehicle has eyes 53 and 54 fixed to the base thereof with support cables 55 and 56 connected to the respective eyes. These support cables are in turn connected to anchor points 57 and 58 located on the support tower 60. The anchor points 57 and 58 are adjacent the test body 52, since the restraining cables and its pulley system are located outside of the supporting cables as opposed to the arrangement shown in FIG. 1.

Restraining cables 64 and 65 are fastened at their midpoints to the test body 52 at a point above the center of gravity thereof, as in the previous embodiment. These restraining cables are connected to turnbuckles 71 and 72, which are in turn connected to restraining cable couplers 69 and 70 that are attached to the support cables at some point between their extremities. Sheaves 76, 77, 78 and 79 are fixed to the support tower and located in the horizontal plane of the restraint cables' connection to the test body. The restraining cables 64 and 65 are entrained over the pulleys similar to the arrangement shown in FIG. 1. Couplers cable pulleys 80 and 81 are fixed to the support tower 60 such that they are located outside of the support cables 55 and 56. The restraining cable couplers 69 and 70 are entrained over these pulleys as shown in FIG. 2.

*Operation*

The restraint systems 10 and 50 operate similarly; therefore, the operation of only the system 10 will be explained in detail. The weight of the test body 12 is carried by the support cables 15 and 16 attached to the base of the vehicle. Stability is provided by the restraint cables 24 and 25 tied between the support cables and the periphery of the vehicle at points 26 and 27 above the vehicle's center of gravity. For minimum pitch restraint, the length of the restraining cables are adjusted with the turnbuckles 31 and 32 such that the tension is sufficient to just hold the vehicle erect. This keeps the test body in a vertical attitude with zero pitch frequency for small amplitudes of oscillation. The same result is obtained with the embodiments shown in FIGS. 1 and 2. The location of the restraint cable coupler pulleys inside or outside of the support cables is primarily for ease in setting up the restraint system. Both arrangements are equally effective in restraining the test body and have a minimal effect on the lateral vibration mode shapes and frequencies.

From the above description of the invention, the many advantages thereof are believed readily apparent. One advantage over the prior art utilizing the support cable technique is that the support cables can be located lower than the test body center of gravity. This greatly reduces the height of the support tower necessary to support the mass of the test body. Although the support tower must still be approximately of the same height as the test vehicle, the area thereof above the point where the support cables are anchored need not have the strength properties of the lower portion since forces of the restraining cables on the sheaves connected to this area are only a fraction of the forces on the supporting cables. The tensioning means for the restraining cables is readily accessible, eliminating much of the setup time required with previous arrangements. Obviously, the cost of the restraint system is much less than previous arrangements, giving results which were heretofore difficult to obtain. Furthermore, the system simulates as nearly as feasible the unrestrained condition of a vehicle in free fall allowing measurement of actual free-free frequencies. Although the suspension system here described has been designed primarily for lateral vibration testing, it may be modified for longitudinal vibration testing by the addition of suitable springs in series with the support cables.

While a preferred embodiment of this invention and a modification thereof has been described, it will be understood that other modifications and improvements may be made thereto. Such of these modifications and improvements as incorporate the principles of this invention are to be considered as included in the hereafter appended claims.

What is claimed as new and desired to be secured by Letters Patent of the United States is:

1. A restraining system for vibrating bodies or the like comprising: a support structure for a test body; a plurality of cable means fixed to the test body and to the support structure at a position below the center of gravity of the test body supporting the weight of the test body in a stabilized position; a plurality of restraining cable means fixed to said plurality of support cable means and to said test body to assist stabilization thereof; sheave and pulley means engaging with said restraining cable means whereby said restraining cable means are directed below the center of gravity of the test body and to some point above the center of gravity of the test body.

2. A restraint system for use with shaking apparatus or the like comprising: support structure for an elongated object to be vibrated; a plurality of cable means attached to the elongated object and support structure below the center of gravity of the elongated object for supporting the weight of and stabilizing the elongated body; and a plurality of restraining cable means tied to the cable means and the elongated object above its center of gravity for maintaining the vehicle erect; and guide means fixed to said support structure for directing said plurality of restraining cable means below the center of gravity of the elongated object and to some point above the center of gravity of the elongated object.

3. A restraint system for use with shaking apparatus or the like as in claim 2 wherein said guide means includes pulley means engaged with said plurality of restraining cable means to facilitate positioning thereof with respect to said elongated object and support structure.

4. A restraint system for use with shaking apparatus or the like as in claim 2 wherein tensioning means is linked into said plurality of said restraining cable means to maintain the elongated object in the proper attitude with respect to the support structure without securing the apparatus in a rigid position.

5. A restraint system for vibrating bodies or the like comprising: a towerlike support structure for supporting a test body adapted to be placed within said support tower; eyes fixed to opposite sides of the base of said test body; a support cable fixed to said eyes and to either side of the support structure at points below the center of gravity of the test body; a pair of pulleys carried by said support structure and located in the plane of said support cables; restraining couplers tied respectively to said support cables at a point between their anchor points and being trained over said pulleys; turnbuckles connected to said restraining couplers and to a pair of restraining cables; and sheaves carried by said support structure and located at a point above the center of gravity of said vehicle; said restraining cables being trained over said sheaves and tied to opposite sides of said vehicle whereby a spring restraint of the vehicle is affected.

6. A restraint system for vibrating bodies or the like as in claim 5 wherein the pulleys are located between the support cables and the vehicle.

7. A restraint system for vibrating bodies or the like as in claim 5 wherein the pulleys are located outwardly of the support cables.

References Cited

FOREIGN PATENTS 749,445   11/1944   Germany.

OTHER REFERENCES

Mixson, John S. et al.: Comparison of Experimental Vibration Characteristics Obtained from a ⅕-Scale Model and from a Full-Scale Saturn SA-1, Langley Research Center, pub. by O.T.S., Dept. of Commerce for NASA, Scientific Library Patent Office Receipt Nov. 27, 1964, pp. 2, 3, 7, 8, 14, 19, 29 and 30.

RICHARD C. QUEISSER, *Primary Examiner.*

J. P. BEAUCHAMP, *Assistant Examiner.*

U.S. Cl. X.R.

89—1.8; 244—110